United States Patent [19]

Morse et al.

[11] Patent Number: 5,000,123
[45] Date of Patent: Mar. 19, 1991

[54] ANIMAL FOOD DISH CONSTRUCTION

[76] Inventors: Diana J. Morse; Jack C. Morse, both of 3040 Mt. View Ext., Moscow, Id. 83843

[21] Appl. No.: 504,670

[22] Filed: Apr. 4, 1990

[51] Int. Cl.⁵ .............................................. A01K 5/00
[52] U.S. Cl. ...................................................... 119/61
[58] Field of Search ................... 119/61, 72; D30/121, D30/123, 129, 132, 133

[56] References Cited

U.S. PATENT DOCUMENTS

| | | | |
|---|---|---|---|
| D. 209,755 | 1/1968 | Robert | D30/133 |
| D. 213,379 | 2/1969 | Robert | D30/133 |
| D. 244,216 | 5/1977 | Gerber | D30/129 |
| 2,542,400 | 2/1951 | Donofrio | 119/61 |
| 3,498,268 | 3/1970 | Sleith et al. | 119/61 |
| 3,841,268 | 10/1974 | Bunger | 119/61 X |
| 4,691,664 | 9/1987 | Crowell | 119/61 |

FOREIGN PATENT DOCUMENTS 37956  9/1927  Denmark .............................. 119/61

Primary Examiner—Gene Mancene
Assistant Examiner—R. Thomas Price
Attorney, Agent, or Firm—Leon Gilden

[57] ABSTRACT

An anti-tipping feed dish formed with a truncated conical exterior wall coaxially defining a feed bowl cavity arranged interiorly of the dish defining a feed bowl floor with a bowl floor spaced from the feed bowl floor defining a lower cavity coaxially arranged with the feed bowl cavity which in turn defines an enclosed cavity capturing a predetermined quantity of weighted materials such as concrete therewithin. Modifications of the instant invention include the bowl floor mounting a series of suction cups to enhance securement of the bowl to a support surface wherein a further embodiment of the invention utilizes selectively reversible suction cups to permit selective removal thereof relative to the bowl and further providing usage of a support bowl frictionally engaging slidably receiving a feed bowl therewithin.

In situations where the food dish is not placed on a support surface, a metal chain link has been firmly placed in the exterior wall so as the food dish may be staked if added securement is needed. This feature would be an additional feature on a dirt surface whereas the suction cups add additional securement on a support surface.

1 Claim, 4 Drawing Sheets

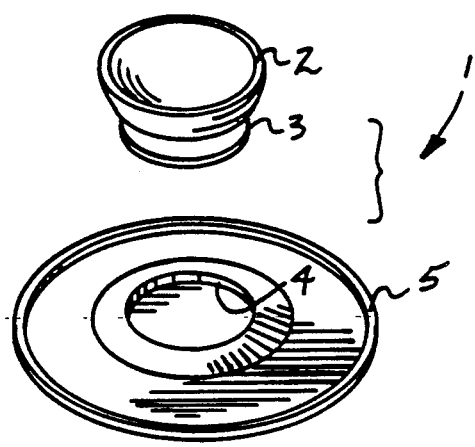
Fig 1
PRIOR ART
Fig 2
PRIOR ART
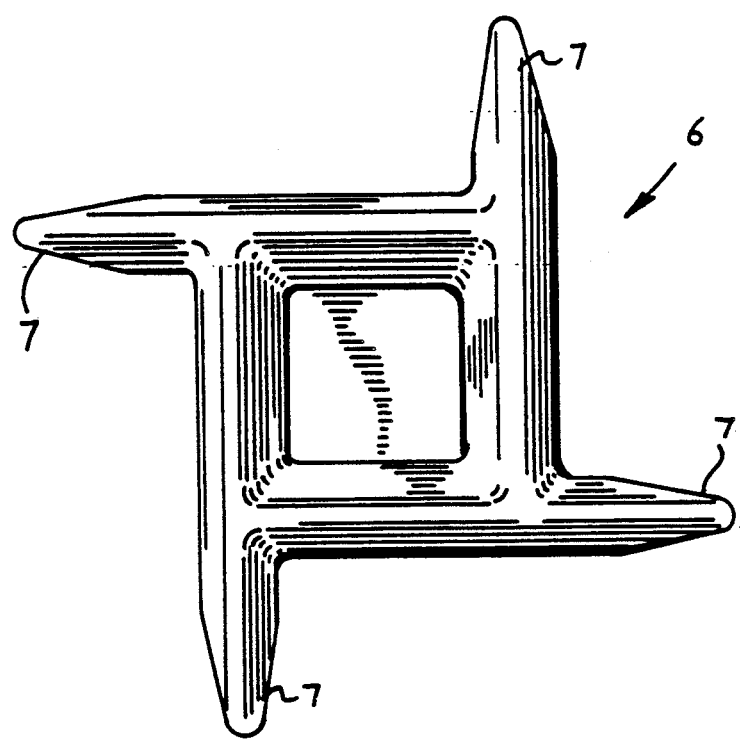

ANIMAL FOOD DISH CONSTRUCTION

BACKGROUND OF THE INVENTION

1. Field of the Invention

The field of the invention relates to feed bowl construction, and more specifically pertains to a new and improved animal food dish construction wherein the same is arranged to minimize inadvertent tipping of the bowl during use. The extra weight keeps unconfined animals from displacing the food dish, preventing loss.

2. Description of the Prior Art

Pet feed bowls are utilized in a variety of positions throughout a dwelling and throughout associated support surfaces adjacent the dwelling. Frequently, pets in their feeding are prone to tip and displace the bowl thereby displacing the contents from the bowl creating undesirable spillage of food with associated waste and unsightliness associated therewith.

Prior art feed bowls as presented in the prior art include U.S. Pat. No. 2,813,509 to BRUNO setting forth animal feeding device wherein an upper bowl is provided with an annular flange receivable within a lower planar support tray wherein the lower tray provides an enlarged support surface to minimize tipping of the bowl structure. The BRUNO patent is remote from that of the instant invention wherein the instant invention provides a feed dish construction wherein the same is of a relatively compact organization as opposed to that of the BRUNO patent providing a support tray of a multiple of diameters greater than that of the bowl it supports to thereby permit an animal to position the animals weight on the support tray while grasping at the central bowl to thereby enable removal of the central bowl from the support tray.

U.S. Pat. No. 3,405,685 to HARRELL sets forth a tip resistent animal feed dish wherein a central dish provides for four legs directed exteriorly from each side of the central polygonal dish to minimize tipping thereof.

U.S. Pat. Nos. Des. 259,669: Des. 294,531, and Des. 296,485 are further examples of feed dishes with enlarged support trays for an upper feed bowl.

As such, it may be appreciated that there continues to be a need for a new and improved animal food dish construction wherein the same addresses both the problems of ease of use as well as effectiveness in construction in minimizing tippage of animal feed bowls and in this respect, the present invention substantially fulfills this need.

SUMMARY OF THE INVENTION

In view of the foregoing disadvantages inherent in the known types of animal food dishes now present in the prior art, the present invention provides a new and improved animal food dish construction wherein the same provides for a compact organization providing a center of gravity underlying the associated food dish cavity floor to minimize tippage of the food dish. As such, the general purpose of the present invention, which will be described subsequently in greater detail, is to provide a new and improved animal food dish construction which has all the advantages of the prior art animal food dish constructions and none of the disadvantages.

To attain this, the animal food dish construction of the instant invention includes an anti-tipping feed dish formed with a truncated conical exterior wall coaxially defining a feed bowl cavity arranged interiorly of the dish defining a feed bowl floor with a bowl floor spaced from the feed bowl floor defining a lower cavity coaxially arranged with the feed bowl cavity which in turn defines an enclosed cavity capturing a predetermined quantity of weighted materials such as concrete therewithin. Modifications of the instant invention include the bowl floor mounting a series of suction cups to enhance securement of the bowl to a support surface wherein a further embodiment of the invention utilizes selectively reversible suction cups to permit selective removal thereof relative to the bowl and further providing usage of a support bowl frictionally engaging slidably receiving a feed bowl therewithin.

In situations where the food dish is not placed on a support surface, a metal chain link has been placed, firmly, in the exterior wall so as the food dish may be staked if additional securement is needed. This would be an additional feature on a dirt surface where as the suction cups add additional securement on a support surface.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved animal food dish construction which has all the advantages of the prior art animal food dish constructions and none of the disadvantages.

It is another object of the present invention to provide a new and improved animal food dish construction which may be easily and efficiently manufactured and marketed.

It is a further object of the present invention to provide a new and improved animal food dish construction which is of a durable and reliable construction.

An even further object of the present invention is to provide a new and improved animal food dish construction which is susceptible of a low cost of manufacture with regard to both materials and labor, and which accordingly is then susceptible of low prices of sale to the consuming public, thereby making such animal food dish constructions economically available to the buying public.

Another object of the present invention is to provide a means of keeping unconfined animals from displacing the food dish because of the extra weight of its construction, preventing loss of the food dish.

Still yet another object of the present invention is to provide a new and improved animal food dish construction which provides in the apparatuses and methods of the prior art some of the advantages thereof, while simultaneously overcoming some of the disadvantages normally associated therewith.

Still another object of the present invention is to provide a new and improved animal food dish construction which may be compactly stored when not being utilized.

Yet another object of the present invention is to provide a new and improved animal food dish wherein the same provides for food dish of compact organization to provide a structure to minimize tippage of an associated food dish.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of a prior art animal food dish.

FIG. 2 is a top orthographic view of a further prior art animal food dish.

DESCRIPTION OF THE PREFERRED EMBODIMENT

Figure 3:
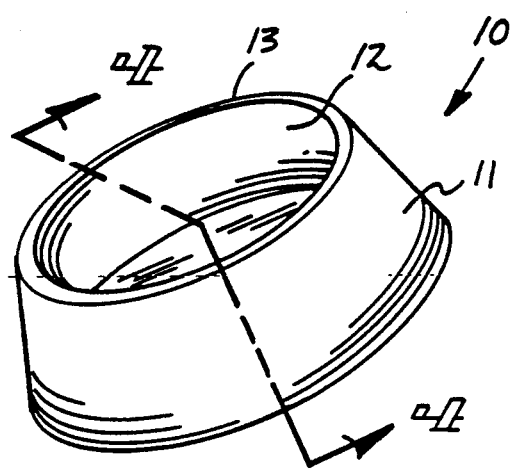
FIG. 3 is an isometric illustration of the instant invention.

With reference now to the drawings, and in particular to FIGS. 1 to 8 thereof, a new and improved animal food dish construction embodying the principles and concepts of the present invention and generally designated by the reference numerals 10, 10a, 10b, and 10c will be described.

FIG. 1 illustrates a prior art food dish construction 1 wherein a bowl 2 includes a lower annular rim 3 receivable within an annular flange floor formed within a lower support tray 5. The lower support tray 5 defines a surface permitting engagement by an animal's feet to thereby permit the animal to grasp the bowl 2 and potentially remove it from the associated tray 5 the food dish 6 illustrated in FIG. 2 utilizes a central cavity utilizing a series of legs 7 arranged at 90 degree angles relative to one another to minimize tippage of the associated central bowl cavity.

More specifically, the animal food dish 10 of the instant invention essentially comprises a truncated conical exterior wall 11 with a cylindrical interior wall 12 coaxially arranged within the exterior wall including an annular upper terminal edge 13. The dish 10 defines accordingly an upper bowl cylindrical cavity 14. The upper bowl cylindrical cavity 14 is bounded at a forward-most end by a planar upper bowl cavity floor 15 wherein the dish floor 16 coaxially spaced therefrom defines a lower cavity 17 coaxially aligned with the upper cavity 14. A concrete filler 18 or the like is arranged to completely fill the enclosed lower bowl cavity 17 to provide a center of gravity of the bowl at a position below the upper bowl cavity floor 15.

Figure 5:
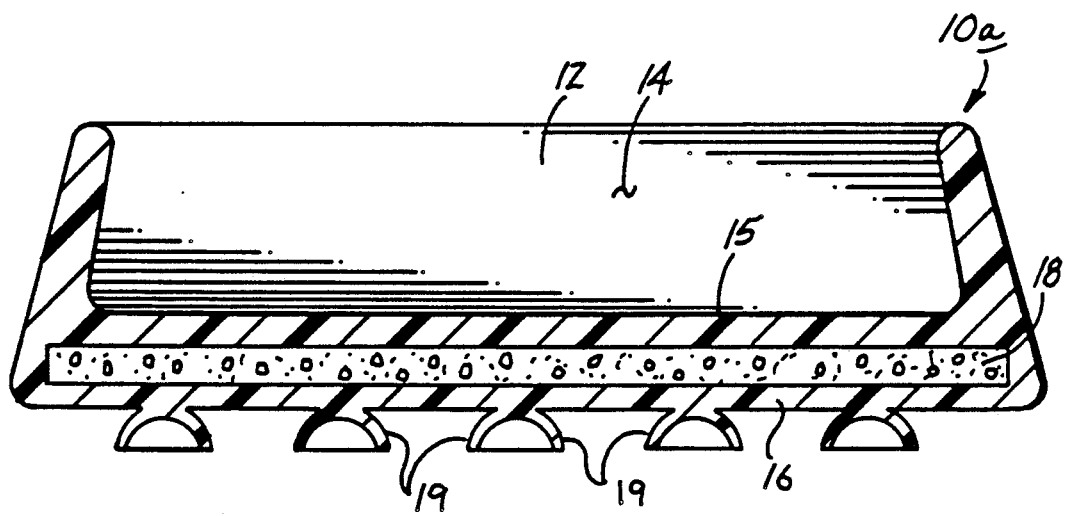
FIG. 5 is a cross-sectional illustration of a modification of the instant invention.
Figure 6:
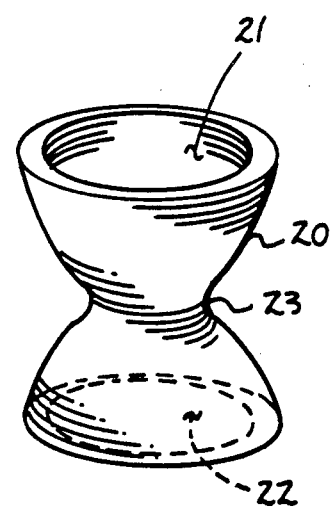
FIG. 6 is an isometric illustration of a modified suction cup utilized by the instant invention.

Reference to FIG. 5 illustrates the use of integrally mounted suction cups 18 and 19 defining a matrix mounted to the dish floor 16 and directed orthogonally relative thereto to permit enhanced securement of the modified food dish 10a onto a support surface.

Referance to FIGS. 3, 4, 5, 7, & 8 illustrates the use of a metal chain link or the such, has been firmly placed in the exterior wall to permit the food dish to be staked if additional securement is needed. This would be an additional feature of the food dish on a dirt surface where as the suction cups add additional securement on a support surface.

Figure 7:
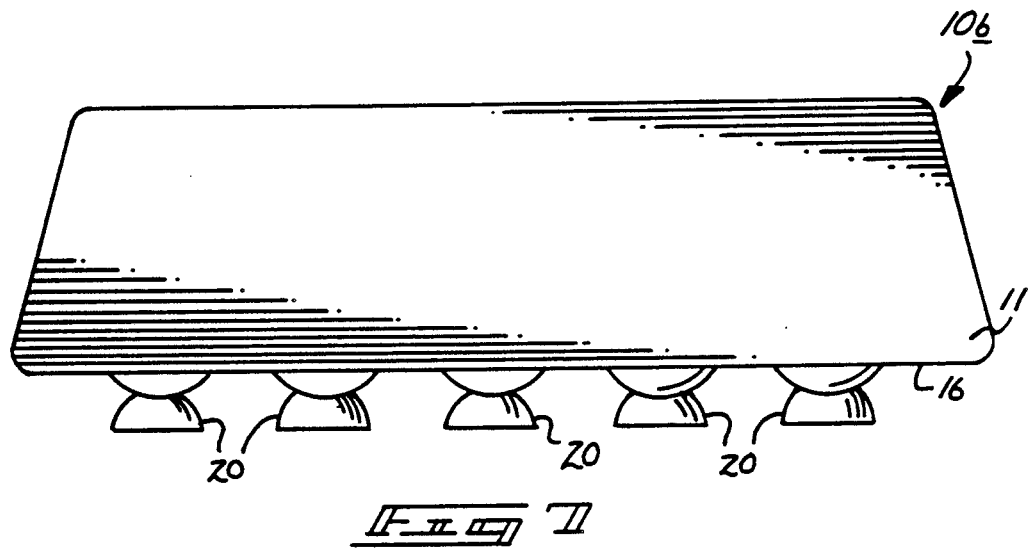
FIG. 7 is an orthographic side view of a further modification of the instant invention.

FIG. 7 illustrates a further modified food dish organization 10b utilizing reversible suction cups 20 selectively securable to the bottom of the dish floor 16 to thereby permit removal therefrom but accordingly permits their securement to the dish floor 16 to provide enhanced engagement and anchoring of the modified dish organization 10b to a support surface. The reversible suction cups 20 include coaxially aligned first and second suction cup cavities 21 and 22 (see FIG. 6) arranged in opposing directions relative to one another and connected by a central connecting web 23.

Figure 4:
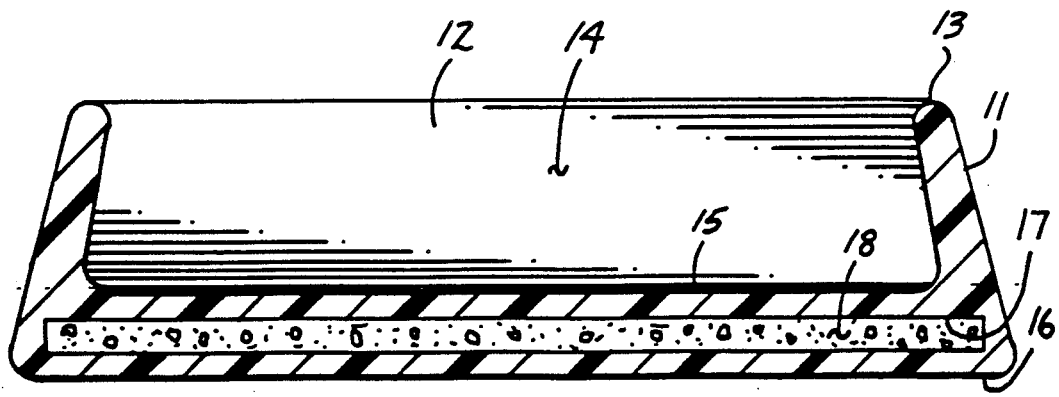
FIG. 4 is an orthographic illustration taken along lines 4—4 of FIG. 3 in the direction indicated by the arrows.
Figure 8:
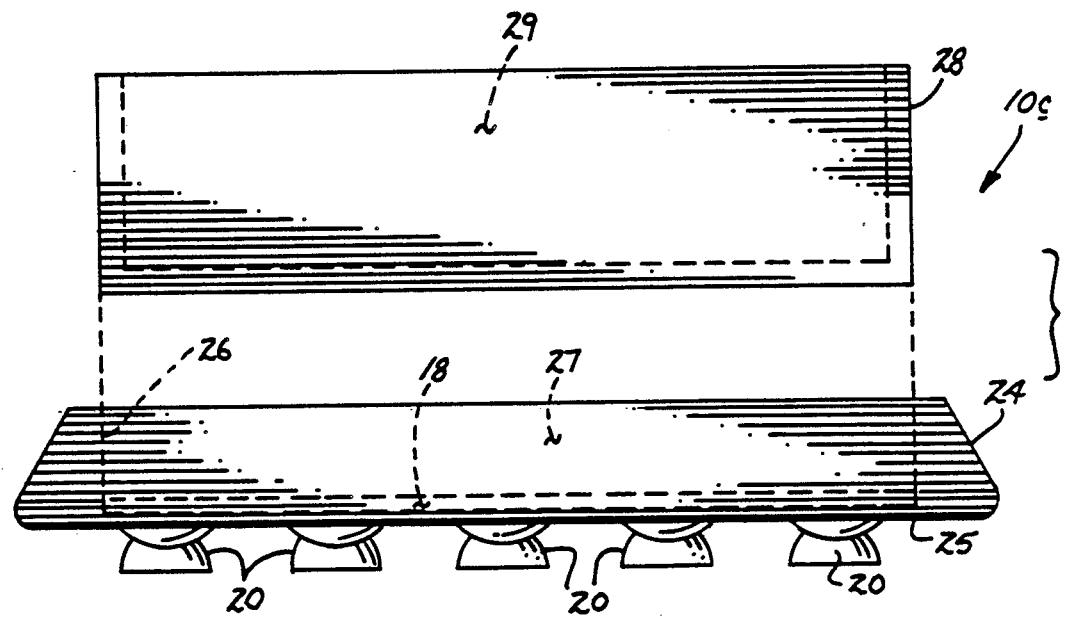
FIG. 8 is an orthographic side view of a yet further modification of the instant invention.

FIG. 8 illustrates a yet further modified animal food dish organization 10c wherein the organization includes a truncated conical exterior wall 24 defining a support bowl including a support bowl receiving cavity 27 therewithin. The cavity 27 is of a cylindrical configuration defining a predetermined diameter including a cylindrical interior wall 26 and a spaced wall 25 defining the concrete filler 18 within the lower cavity 17 in a manner as illustrated in FIG. 4 for example. The lower receiving cavity 27 frictionally engages an exterior cylindrical wall of a cylindrical feed bowl 28 defining a feed bowl cavity 29 therewithin. The feed bowl 28 defines an external diameter substantially equal to the predetermined diameter of the support bowl cavity 27 to permit selective filling of the removable feed bowl 28 and thereby permitting permanent mounting of the support bowl 24 to a support surface such as a floor and the like.

As to the manner of usage and operation of the instant invention, the same should be apparent from the above disclosure and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An animal food dish organization comprising,
    a truncated conical exterior wall coaxially arranged about a cylindrical bowl cavity, the bowl cavity including an annular bowl wall spaced interiorly of the conical exterior wall, and
    the cylindrical bowl cavity defined by a planar bowl cavity floor, and
    a planar dish floor spaced below and parallel the bowl cavity floor with an enclosed lower cavity arranged between the bowl cavity floor and the dish floor, and interiorly of the cylindrical wall lower cavity positioned completely below the bowl cavity floor, and
    the bowl cavity floor including a weighted filler material completely filling the lower cavity to define a center of gravity of the food dish organization positioned below the bowl cavity floor, and
    including a matrix of suction cups orthogonally arranged and directed outwardly from a bottom surface of the dish floor, and
    wherein the suction cups are defined as reversible suction cups including a first suction cup cavity coaxially aligned with a second suction cup cavity, the first and second suction cup cavities secured together by a central web and the first and second suction cup cavities arranged in reverse directions relative to one another, and
    further including a cylindrical feed bowl frictionally receivable within the cylindrical bowl cavity, the cylindrical feed bowl including an exterior cylindrical wall defining a predetermined diameter substantially equal to a diameter defined by the cylindrical bowl cavity, and
    wherein the cylindrical feed bowl includes an upper annular edge, and the truncated conical exterior wall defines a further annular edge positioned below the annular edge when the cylindrical feed bowl is secured within the cylindrical bowl cavity.

* * * * *